H. H. BEERS.
MOLE TRAP.
APPLICATION FILED MAR. 3, 1913.

1,079,827.

Patented Nov. 25, 1913.

WITNESSES
Philip E. Barnes
E. J. Sheehy

INVENTOR
H. H. Beers.
James J. Sheehy & Co., Attorneys

UNITED STATES PATENT OFFICE.

HENRY H. BEERS, OF MIDDLEBURY, INDIANA.

MOLE-TRAP.

1,079,827. Specification of Letters Patent. Patented Nov. 25, 1913.

Application filed March 3, 1913. Serial No. 751,760.

*To all whom it may concern:*

Be it known that I, HENRY H. BEERS, a citizen of the United States, residing at Middlebury, in the county of Elkhart and State of Indiana, have invented new and useful Improvements in Mole-Traps, of which the following is a specification.

My present invention has to do with mole traps; and it contemplates the provision of a simple, easily set and efficient trap for catching and destroying moles.

Figure 1:
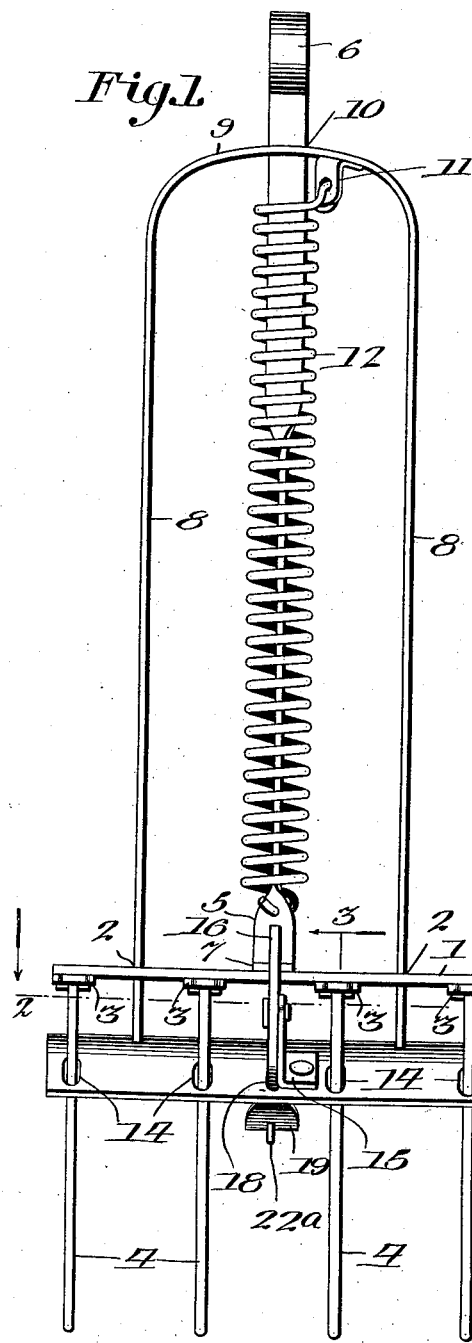
Figure 2:
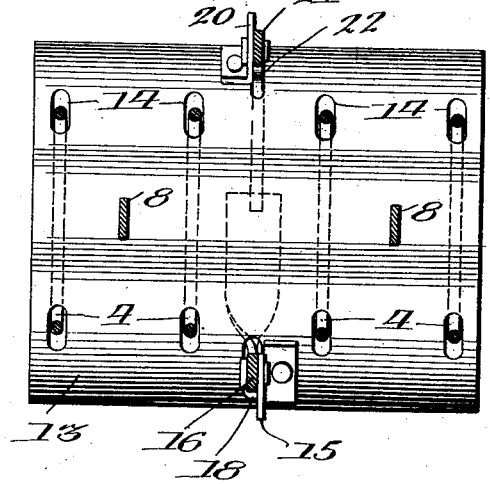
Figure 3:
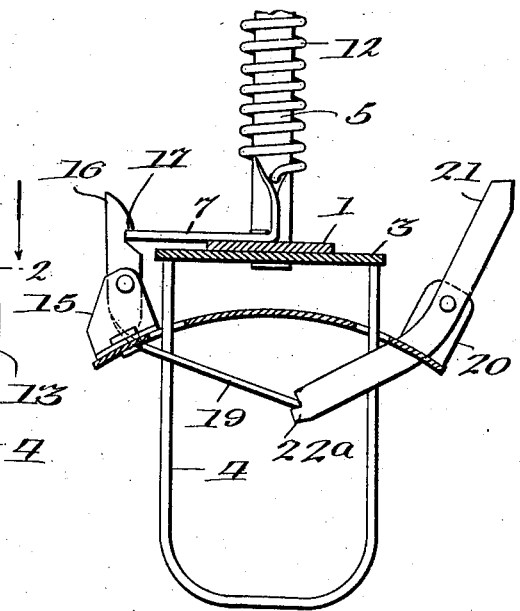

The invention in all of its details will be fully understood from the following description and claims when the same are read in connection with the drawings, accompanying and forming part of this specification, in which:

Figure 1 is a side elevation illustrating the trap constituting the best practical embodiment of my invention that I have as yet devised, as the same appears when set and ready for use. Fig. 2 is a horizontal section, taken in the plane indicated by the line 2—2 of Fig. 1, looking downwardly. Fig. 3 is a vertical section taken in the plane indicated by the line 3—3 of Fig. 1, looking in the direction indicated by the arrow.

Similar numerals of reference designate corresponding parts in all of the views of the drawings.

Among other features, my novel trap comprises a body plate 1 having vertically disposed apertures 2. Fixed to and extending laterally from the body plate are arms 3, which are spaced apart, and to the outer ends of said arms are fixedly connected the ends of depending loops 4, which are preferably, though not necessarily, formed of heavy wire.

Fixed to and extending upwardly from the body plate 1 is a bar 5 which terminates at its upper end in a handle 6. At its lower end the said bar is provided with an arm 7 that reaches laterally beyond the body plate 1, and is designed to coöperate with the trigger of the trap, in the manner hereinafter set forth.

Extending loosely through the apertures 2 in the body plate 1 are bars 8, and these bars are connected at 9 by a portion in which is provided an aperture 10 that loosely receives the handle bar 5.

Surrounding the handle bar 5 and connected at its upper end to a lug 11 on the portion 9, and at its lower end to the lower portion of the handle bar 5, is a retractile spring 12.

Fixed to the lower ends of the bars 8 is a pressure plate 13. This pressure plate is preferably curved in the direction of its width, and is provided with apertures 14 that loosely receive the side bars of the loops 4.

Pivoted to a standard 15 that is fixed to and rises from the plate 13, is a trigger 16 having a beveled end and a notch 17, the latter to receive the end of the arm 7. The said trigger is pivoted at an intermediate point in its length, and its lower arm is loosely carried through an aperture 18 in the plate 13. Below the said plate 13 the lower arm of the trigger 16 merges into a flat plate 19. The said flat plate 19 extends inwardly from the aperture 18 and the lower arm of the trigger 16 to a point beyond the longitudinal median line of the trap, as shown.

Fulcrumed at an intermediate point of its length on a standard 20 that is fixed to the pressure plate 13 is a vertically swinging safety lever 21. The lower arm of said lever 21 extends loosely through an aperture 22 in the pressure plate 13, and terminates at its lower end in a reduced portion 22ª designed to offer an abutment to the end of the flat plate 19.

In order to set my novel trap, it is simply necessary to raise the pressure plate 13 against the action of the retractile spring 12, and then place the trigger 16 in engagement with the arm 7, so as to retain the pressure plate in said position. With this done, the safety lever 21 is engaged with the flat plate 19 in order to lessen the liability of the trap being accidentally sprung during the positioning of the trap relative to the runway of moles. This will be better understood when it is stated that in the position shown in Fig. 3, the inner arm of the lever 21 will prevent upward movement of the lower arm of the trigger 16 and outward movement of the upper arm of said trigger, while when the lower arm of the lever 21 is swung downwardly, the lower arm of the trigger will be left free for upward movement in the manner and for the purpose hereinafter described. With the trap set as described, the loops 4 are pressed downwardly into ground that has been loosened above and adjacent a runway, so that the line of the runway passes through each loop. The loops 4 are pressed downwardly as stated, until the plate 19 contacts with the ground, and then the safety lever 21 is moved by hand to disengage it from the flat plate 19, and leave the latter and the trigger free to be moved by slight upward pressure of the ground.

The trap operates as follows: When the mole traverses the runway and raises the ground, the ground will act against and raise the plate 19, and thereby swing the trigger 16 out of engagement with the arm 7, whereupon the spring 12 will contract and draw the loops 4 upwardly and in that way catch and destroy the mole between the bights of the loops 4 and the underside of the pressure plate 13.

From the foregoing description read in connection with the drawings, the advantages of the invention will be readily appreciated by those skilled in the art, but it is to be understood that the construction shown is merely illustrative of the present and best embodiment of my invention of which I am cognizant, and that in the future practice of the invention such changes may be made as are within the scope of the appended claims.

Having described my invention, what I claim and desire to secure by Letters-Patent, is:

1. A trap comprising a plurality of spaced depending loops, a pressure plate having appertures loosely receiving the arms of the loops, a body plate, arms fixed to and extending laterally from said body plate and fixedly connected to the arms of the several loops, above the pressure plate, a lateral trigger-engaging arm fixed to and extending from the body plate, a bar fixed with respect to and extending upwardly from the body plate, a loop-shaped frame fixed at its ends to the pressure plate and loosely receiving said bar in its bight portion and having its sides loosely arranged in apertures in the body plate, a retractile spring surrounding said bar and connected at its upper end with the bight of the frame and at its lower end with the bar, a standard fixed to and rising from the pressure plate adjacent one side edge thereof, and a trigger fulcrumed on the said standard and having a beveled head at its upper end arranged to engage the trigger-engaging arm of the body plate and also having its lower arm loosely arranged in an aperture of the pressure plate and terminating below the pressure plate in a plate that is substantially parallel to the pressure plate.

2. A trap comprising a plurality of spaced depending loops, a pressure plate that loosely receives the arms of the loops, means fixedly connecting the arms of the several loops, above the pressure plate, a lateral arm fixed to and extending from said means, a bar fixed with respect to and extending upwardly from said means, a frame fixed to the pressure plate and loosely receiving said bar, a retractile spring surrounding said bar and connected at its upper end with said frame and at its lower end with the bar, a trigger pivoted on a support carried by the pressure plate and having on its lower arm a plate disposed below the pressure plate; said trigger being arranged to engage the arm on said connecting means, and a safety lever fulcrumed on a support on the pressure plate and having an arm that extends below said plate and is provided with means for engaging the plate on the lower arm of the trigger.

3. A trap comprising a loop-shaped portion, a pressure plate loosely mounted on said loop-shaped portion, a trigger carried by said plate and having a portion disposed below the pressure plate and adapted to be pressed upwardly by the ground below it, means carried by the loop-shaped portion and arranged to coöperate with said trigger, means including a spring for moving the loop-shaped portion with respect to the pressure plate when the trigger is disengaged from the means that coöperates therewith, and a safety lever mounted on the pressure plate and having an arm disposed below said plate and provided with means for engaging the said portion on the lower arm of the trigger.

In testimony whereof I have hereunto set my hand in presence of two subscribing witnesses.

HENRY H. BEERS.

Witnesses:
 B. F. DEAHL,
 L. BURR WHIPPY.

---

Copies of this patent may be obtained for five cents each, by addressing the "Commissioner of Patents, Washington, D. C."